United States Patent [19]

Shigihara

[11] Patent Number: 4,868,817
[45] Date of Patent: Sep. 19, 1989

[54] CIRCUIT FOR PREVENTING A MICROCOMPUTER FROM MALFUNCTIONING

[75] Inventor: Hideo Shigihara, Saitama, Japan
[73] Assignee: Kabushiki Kaisha Toshiba, Kawasaki, Japan
[21] Appl. No.: 58,269
[22] Filed: Jun. 4, 1987

[30] Foreign Application Priority Data

Jun. 9, 1986 [JP] Japan ............................ 61-131795

[51] Int. Cl.$^4$ ............................................. G06F 11/30
[52] U.S. Cl. ............................................. 371/4; 371/62; 371/66
[58] Field of Search ............... 371/4, 12, 14, 62, 66; 364/200 MS File, 900 MS File; 340/662

[56] References Cited

U.S. PATENT DOCUMENTS

| | | | |
|---|---|---|---|
| 4,399,538 | 8/1983 | Cholakian | 371/4 X |
| 4,410,991 | 10/1983 | Lenart | 371/66 |
| 4,580,222 | 4/1986 | Fujii | 371/66 X |
| 4,625,309 | 11/1986 | Nitschke | 371/62 X |
| 4,689,766 | 8/1987 | Kent | 364/900 |
| 4,786,862 | 11/1988 | Sieron | 371/14 X |

*Primary Examiner*—Jerry Smith
*Assistant Examiner*—Robert W. Beausoliel
*Attorney, Agent, or Firm*—Cushman, Darby & Cushman

[57] ABSTRACT

A train of pulses within a predetermined cycle is produced at a first port of a microcomputer when the microcomputer is operating normally. An operational amplifier compares a voltage obtained by rectifying the pulse train with a reference potential. The microcomputer is reset, depending on the comparison result obtained at the output terminal of the operational amplifier. The output of a power supply circuit is used as a reference potential. When an overcurrent flows in peripheral circuits connected to the microcomputer, the output voltage of the power supply circuit is decreased. This decrease varies the reference potential applied to the operational amplifier. The microcomputer outputs a power supply control pulse from a second port, after it is reset. A relay turns off the power of the power supply circuit to the peripheral circuits.

14 Claims, 4 Drawing Sheets

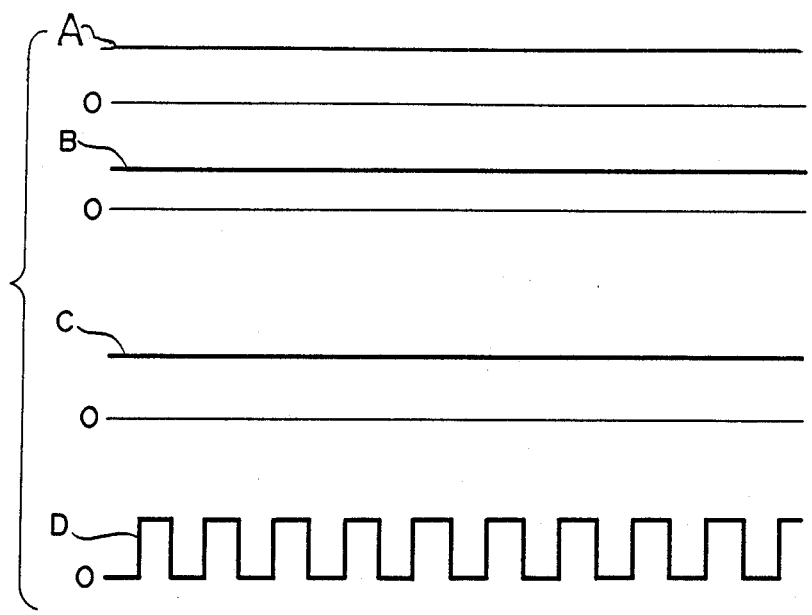
F I G. 3
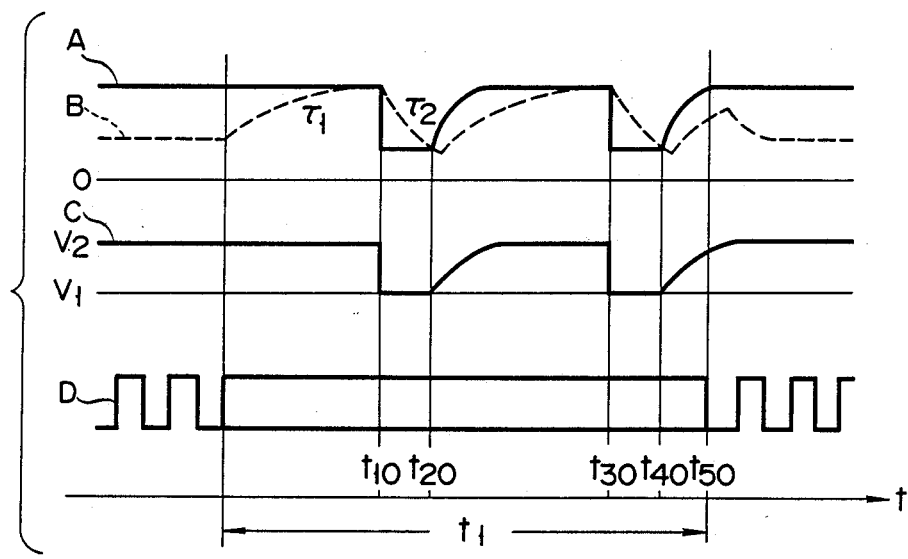
F I G. 4

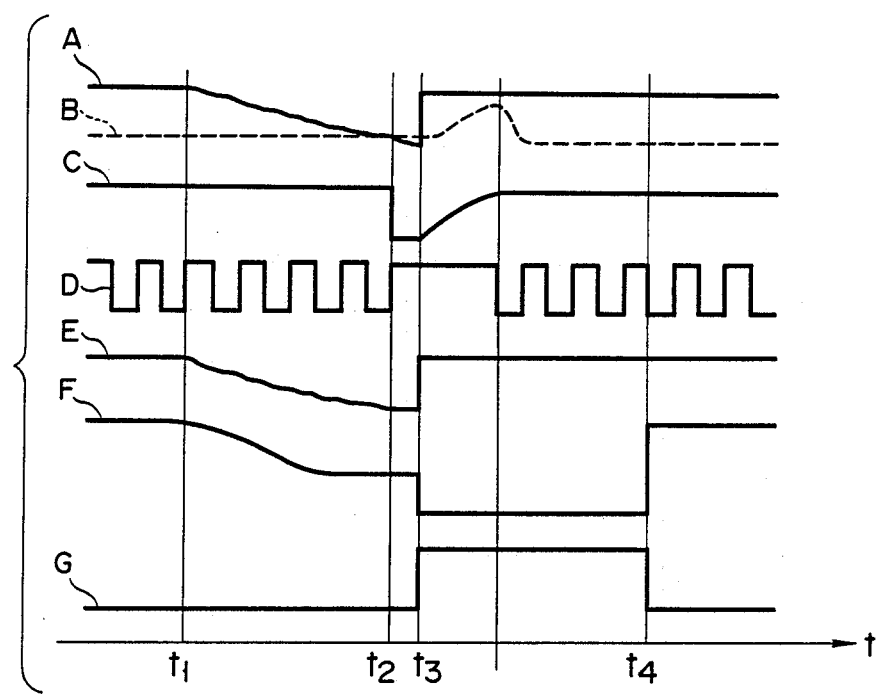
F I G. 5

CIRCUIT FOR PREVENTING A MICROCOMPUTER FROM MALFUNCTIONING

BACKGROUND OF THE INVENTION

The present invention relates to a circuit for preventing a microcomputer from malfunctioning, in particular to a circuit which functions both to stop the runaway of a microcomputer and to protect the peripheral circuits of the microcomputer from overcurrent.

Circuits for preventing a microcomputer from malfunctioning are known, which detect a runaway condition of the microcomputer by way of the operation of a timer called a "watchdog timer", and then reset the microcomputer. The most commonly used of such circuits includes a counter which is provided outside the microcomputer. When the counter overflows, the microcomputer is reset. Specifically, when the microcomputer is operating normally, the microcomputer supplies a counter-reset signal before the counter overflows; therefore, the counter never overflows. If the microcomputer becomes runaway, the microcomputer does not supply a counter-reset signal. Then, the counter overflows and the microcomputer per se is reset. When the microcomputer is reset, the program counter is reset, and the interrupt operation, input/output port latching, and command register are initialized. As a result, the runaway condition of the microcomputer is stopped. Such a watchdog timer does, however, require a large area on the circuit board.

Various peripheral circuits are connected to the microcomputer. In such peripheral circuits, an over-current can flow due to circuit trouble, possibly damaging the circuit components. To prevent this scenario, various protection circuits have been developed which detect the overcurrent when it is generated, and turn off the power supply to the peripheral circuits.

The watchdog timer for preventing the microcomputer from malfunctioning, and the overcurrent protection circuit for the peripheral circuits of the microcomputer, are arranged on the board as separate circuits. These circuits occupy a large area on the board, resulting in a higher manufacturing cost.

SUMMARY OF THE INVENTION

Accordingly, an object of the present invention is to provide a circuit for preventing a microcomputer from malfunctioning, having both a watchdog function for a microcomputer and an overcurrent protection function for peripheral circuits.

To achieve the above object, a circuit is provided for preventing a microcomputer from malfunctioning, comprising a microcomputer having a first port, a second port, and a reset terminal, and for executing a predetermined operation, the microcomputer outputting a train of pulses within a predetermined cycle from the first port when it is operating normally, for temporarily performing a reset operation when it receives a reset pulse at the reset terminal, and for outputting a power supply control pulse from the second port, in response to the reset operation, peripheral circuit means connected to the microcomputer, power supply circuit means for generating power for energizing the microcomputer and the peripheral circuit means, reset pulse generating means for receiving the pulse train from the first port of the microcomputer and the output voltage of the power supply circuit means, for generating the reset pulse upon detecting an abnormality in at least one of the input signals, and for supplying the pulse to the reset terminal of the microcomputer, and power supply control means for receiving the power supply control pulse from the second port of the microcomputer, and for stopping the power supply of the power supply circuit means to the peripheral circuit means, in response to the control pulse, the power supply control pulse being output from the second port of the microcomputer after the reset operation of the microcomputer is performed in response to the reset pulse generated by the reset pulse generating means.

BRIEF DESCRIPTION OF THE DRAWINGS

FIG. 3 is a timing chart for explaining a circuit operation of the circuit of the present invention, when the microcomputer is operating normally;

FIG. 4 is a timing chart for explaining a circuit operation of the circuit of the present invention, when the microcomputer is operating abnormally; and FIG. 5 is a timing chart for explaining a circuit operation of the circuit of the present invention, when overcurrent flows in a microcomputer peripheral circuit.

DETAILED DESCRIPTION OF THE PREFERRED EMBODIMENT

Figure 1:
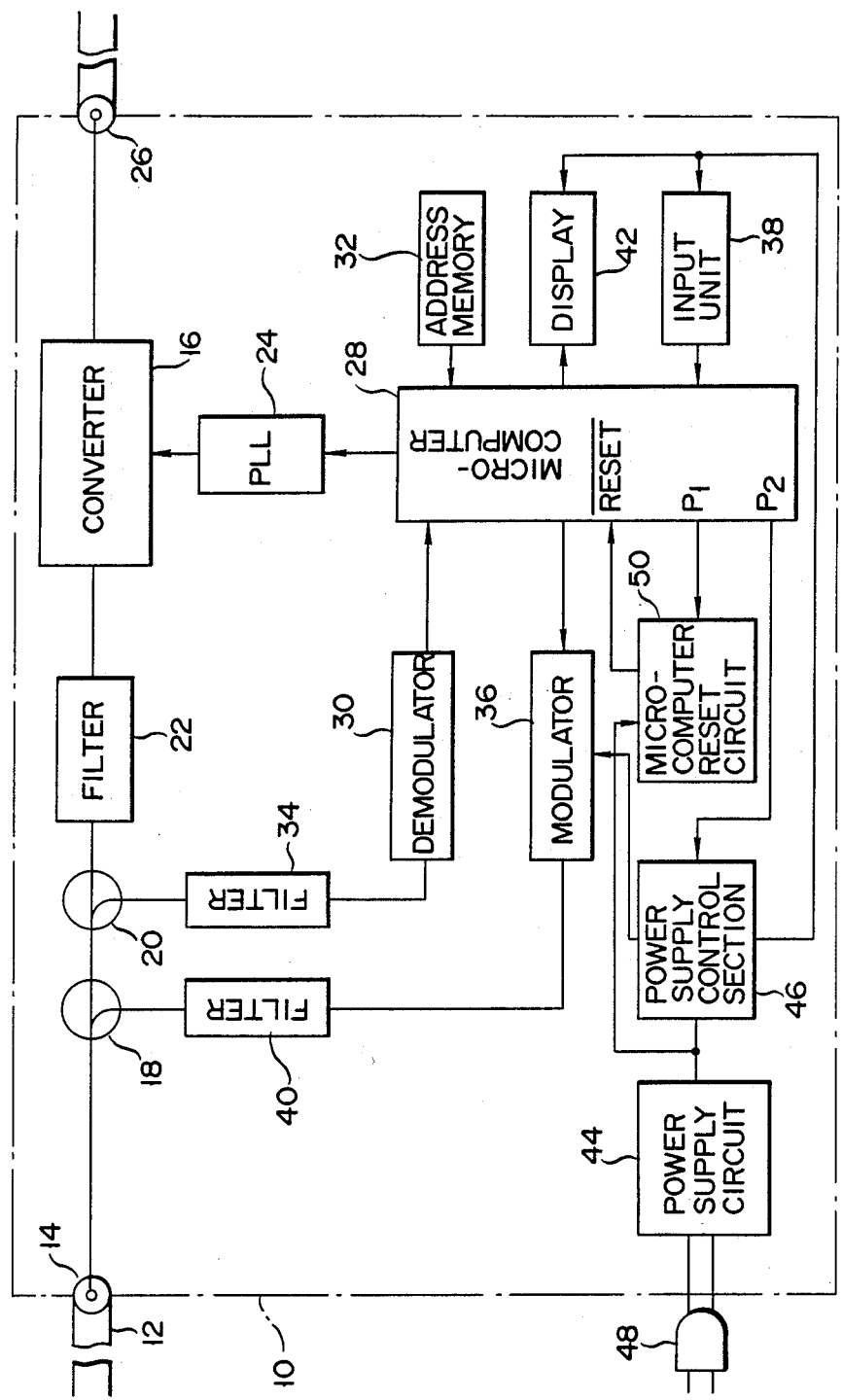
FIG. 1 shows a block diagram illustrating a circuit for preventing a microcomputer from malfunctioning, according to the present invention, when it is applied to a bidirectional CATV system.

An embodiment of the present invention will now be described, with reference to the accompanying drawings. FIG. 1 shows an embodiment of a circuit for preventing a microcomputer from malfunctioning, according to the present invention, when it is applied to a CATV terminal for pay television programs. In CATV terminal 10, a pay television signal is sent from a central TV station (not shown) via trunk cable 12, and is supplied to input terminal 14. The input signal is then supplied to converter 16 via distributors 18 and 20 and filter 22. Converter 16 frequency-converts the pay television signal to a signal at a predetermined receive frequency, by means of the output signal of PLL (phase-locked loop) circuit 24. The frequency-converted signal is output from output terminal 26, and is supplied to a display apparatus (not shown).

The frequency-conversion of converter 16 depends on the frequency of the signal generated by PLL circuit 24. PLL circuit 24 is controlled by microcomputer 28, which is connected to demodulator 30 and address memory 32. Demodulator 30 demodulates the data which is distributed by distributor 20 and supplied via filter 34. Microcomputer 28 compares the demodulated data supplied from demodulator 30 with the specified address supplied from address memory 32. When the two coincide, microcomputer 28 controls PLL circuit 24, so as to cause PLL circuit 24 to supply a signal of an appropriate frequency. With this feature, only the subscriber can watch the program.

Microcomputer 28 is also connected to demodulator 36 and input unit 38. Input unit 38 is for inputting the subscriber's data. The subscriber's data as input from input unit 38 is processed by microcomputer 28. The processed data is modulated by modulator 36, and is output from CATV terminal 10 via filter 40, distributor 18, and input terminal 14. It is then sent to the central TV station via trunk cable 12. In this way, upstream communication is performed. Microcomputer 28 is also connected to display 42 for displaying the channel data and the like, as input by input unit 38.

As is typically illustrated by input unit 38 and display 42, those sections constituting CATV terminal 10 are energized by power supply circuit 44 via power supply control section 46. Power supply circuit 44 is connected to home-use AC power source via plug 48, to generate DC power of a predetermined voltage.

Generally, microcomputer 28 performs data-access between the center and the subscriber, for example, for deciding whether or not the subscriber has subscribed to the program he desires, and performs control of PLL circuit 24. If microcomputer 28 enters the runaway condition however, there occurs a case in which data is sent upstream when it should not. When such a case occurs, other subscribers' terminals are affected. To prevent this, microcomputer reset circuit 50 is provided.

When microcomputer 28 is operating abnormally, microcomputer reset circuit 50 supplies a reset signal to reset terminal $\overline{RESET}$ of microcomputer 28, to reset the latter. In response to the reset operation, microcomputer 28 controls power supply control section 46, to stop the power supply to the peripheral circuits of the microcomputer, such as modulator 36, input unit 38, and display 42.

There also occurs a case in which an overcurrent flows in the peripheral circuits, due to a problem in the circuit, and the like. This overcurrent is detected by microcomputer reset circuit 50, based on a change in the output voltage of power supply circuit 44. Upon detection, reset circuit 50 supplies a reset signal to microcomputer 28. In response to the reset signal, microcomputer 28 is reset and subsequently controls power supply control circuit 46, to stop the power supply to the peripheral circuits, so as not to damage the peripheral circuits.

As has been described above, when the microcomputer malfunctions, and when an overcurrent flows in the peripheral circuits, the operation of the microcomputer ceases, and the power supply to the peripheral circuits is stopped. This prevents the microcomputer from runaway, and protects the peripheral circuits.

When the circuit for preventing a microcomputer from malfunctioning, according to this invention, is applied to a CATV terminal, and when the above-mentioned defects occur, no signal is superposed on the upstream, for the above reason. Thus, it can be prevented from affecting other subscribers' terminals. With this feature, the circuit for preventing the microcomputer from malfunctioning, according to this invention, is especially suited for the bidirectional CATV.

Figure 2:
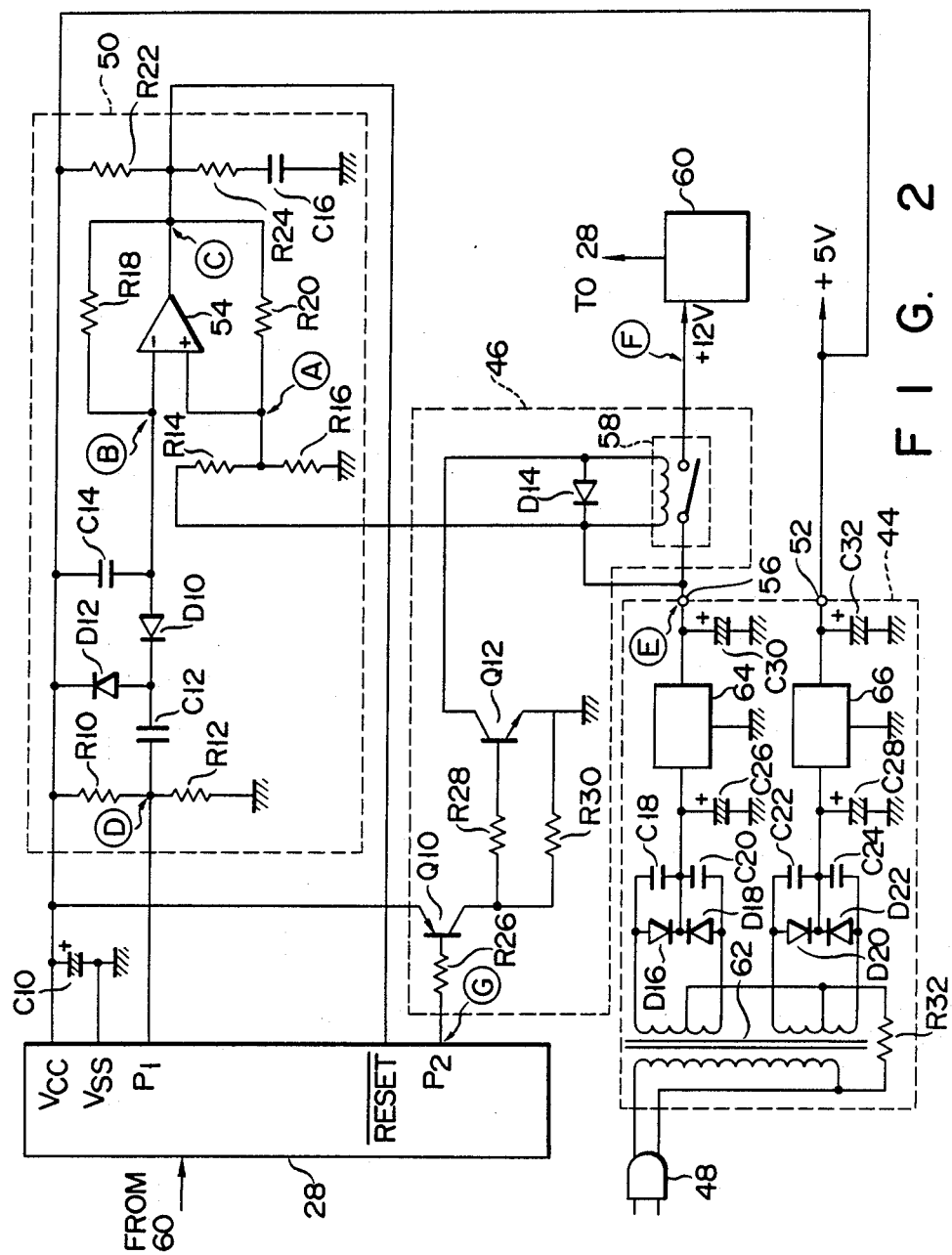
FIG. 2 shows a circuit configuration illustrating in detail the circuit of the present invention.

FIG. 2 shows a circuit diagram illustrating in detail the circuit for preventing a microcomputer from malfunctioning, as shown in FIG. 1. In FIG. 2, like portions shown in FIG. 1 are denoted by like reference numerals.

Microcomputer 28 includes first port P1, second port P2, reset terminal $\overline{RESET}$ (which is low active, for example), first power input terminal Vcc, and second power input terminal Vss. First port P1 outputs a pulse at a predetermined frequency. Second port P2 outputs a positive pulse after a reset operation. First power input terminal Vcc is connected to first voltage output terminal 52 of power supply circuit 44 for outputting a first predetermined voltage (+5 V). Terminal Vcc is further connected to ground via capacitor C10. Second power input terminal Vss is also connected to ground.

The pulse at the predetermined frequency output from first port P1 is obtained by running a software program on microcomputer 28, for example. The pulses are continuously produced when microcomputer 28 is operating normally. When it is operating abnormally, some pulses are dropped. The pulse from first port P1 is used as an index pulse for indicating whether or not microcomputer 28 is operating normally. By detecting the pulse from first port P1, the watchdog operation for detecting the runaway of microcomputer 28 is performed.

Microcomputer reset circuit 50 includes resistors R10 and R12 for converting the pulse supplied from first port P1 of microcomputer 28 into a pulse of a predetermined level. First port P1 is connected to the node of resistors R10 and R12 which are connected in series between first voltage output terminal 52 of power supply circuit 44 and the ground potential.

The converted pulse is rectified by a rectifier circuit made of capacitors C12 and C14 and diodes D10 and D12, where it is converted into a DC signal at a fixed potential. The DC signal is then supplied to the inverting terminal of operational amplifier 54. The rectifier circuit serves essentially as a Cockcroft circuit. It also functions as a buffer circuit between first port P1 of microcomputer 28 and operational amplifier 54.

The rectifier circuit has an apparently high impedance as viewed from the inverting terminal of operational amplifier 54. When microcomputer 28 enters runaway, the pulse supplied from first port P1 is stopped, but the pulse level is kept as it is. However, operational amplifier 54 is required to change the potential at the inverting terminal at the same time constant, irrespective of whether the pulse is at low or high level. It is for this reason that the rectifier circuit has apparently a high impedance.

As for the configuration of the rectifier circuit, capacitor C12 and diode D10 are connected in series between the node of resistors R10 and R12 and the inverting terminal of operational amplifier 54. Diode D12 is connected between the node of capacitor C12 and diode D10 and first voltage output terminal 52. Capacitor C14 is connected between the inverting terminal of operational amplifier 54 and first voltage output terminal 52. The anode of diode D10 is connected to the inverting terminal of operational amplifier 54, while the cathode is connected to the anode of diode D12. The cathode of diode D12 is connected to first voltage output terminal 52.

The voltage obtained by dividing the voltage of second voltage output terminal 56 with resistors R14 and R16, is applied to the noninverting terminal of operational amplifier 54. The series circuit composed of resistors R14 and R16 is connected between second voltage output terminal 56 of power supply circuit 44, for outputting the second predetermined voltage (+12 V), and the ground potential. The noninverting terminal of operational amplifier 54 is connected to the node of resistors R14 and R16.

Resistor R18 is connected between the output terminal and the inverting terminal of operational amplifier 54, while resistor 20 is connected between the output terminal and the noninverting terminal. The output terminal of operational amplifier 54 is connected to first voltage output terminal 52 via resistor R22, and is grounded via a time-constant circuit made up of a series circuit of resistor R24 and capacitor C16. This time-constant circuit is generally used for absorbing jitters which occur in the output signal from the output terminal of operational amplifier 54.

With such a configuration, operational amplifier 54 essentially functions as a multivibrator. By means of the output of the multivibrator, reset terminal $\overline{\text{RESET}}$ of microcomputer 28 is controlled, thus executing the watchdog operation.

Next, the watchdog operation will be described. FIG. 3 shows the waveforms at the points denoted by characters A to D in microcomputer reset circuit 50 in FIG. 2. In FIG. 3, waveform A is the waveform of the voltage at point A, i.e., the voltage obtained by dividing, with resistors R14 and R16, the second predetermined voltage (+12 V) of second voltage output terminal 56 of power supply circuit 44. Waveform B is that of the voltage at point B, i.e., the voltage of the signal obtained by rectifying the pulse derived from first port P1 of microcomputer 28. Waveform C is that of the output voltage of operational amplifier 54. Waveform D is that of the pulse from first port P1. The waveforms shown in FIG. 3 are those when microcomputer 28 is normally operating. When it is operating normally, and pulses are continuously obtained from first port P1, operational amplifier 54 as a multivibrator does not oscillate, and the voltages at points A to C are at fixed values.

When malfunction of some kind occurs in microcomputer 28, and the pulses which should be obtained from first port P1 are dropped, the multivibrator starts oscillation. This oscillation forms a reset pulse for reset terminal $\overline{\text{RESET}}$ of microcomputer 28. When the reset pulse is supplied, microcomputer 28 is reset.

FIG. 4 shows the waveform at each point in the above case. FIG. 4 explains how the reset pulse is formed by the oscillation of operational amplifier 54 as a multivibrator when the pulses from first port P1 are dropped.

In FIG. 4, it is assumed that the pulses from first port P1 (waveform D) are dropped during time period t1. When the pulses are dropped, the potential (waveform B) of the inverting terminal of operational amplifier 54 gradually increases. The time constant $\tau 1$ at which the potential increases is determined by the values of capacitor C14 and resistors R18 and R22. As capacitor C14 is charged, at time t10, the potential at the inverting terminal is over that of the input potential (waveform A) of the noninverting terminal of operational amplifier 54. Operational amplifier 54 then inverts its state, and the potential at point A suddenly drops. The potential (waveform C) at the output terminal of operational amplifier 54 also decreases suddenly, and remains at potential V1 until the potential at the inverting terminal becomes larger than that at the noninverting terminal, at time t20.

The potential at the output terminal of operational amplifier 54 then changes to level V2 at a predetermined time constant. This time constant determined by the time-constant circuit of resistor R24 and C16, and resistor R22. The output voltage at level V1 of operational amplifier 54 from time t10 to t20 is used as the reset pulse for microcomputer 28.

Microcomputer 28 is then temporarily reset. If the abnormal state of microcomputer 28 continues, then the pulse is not obtained from first port P1, and operational amplifier 28 as a multivibrator continuously operates. The time constant, which determines a voltage change in the oscillating operation at the inverting terminal of operational amplifier 54, is determined by capacitor C14 and resistor R18 and R22, charging time constant $\tau 1$, as described earlier. The discharging time constant $\tau 2$ is determined by capacitor C14 and resistor R18.

When microcomputer 28 is reset at time t20, but if the pulse is not obtained from first port P1, as described above, then a reset signal is obtained again at time t30 at which the voltages at the inverting and noninverting terminals of operational amplifier 54 are equal to each other. Microcomputer 28 is reset again by the pulse obtained from time t30 to t40. As described above, operational amplifier 54 oscillates at the inverting terminal with the period of $(\tau 1 + \tau 2)$. The oscillation continues unless a pulse is obtained from first port P1.

Let us assume now that at time t50, microcomputer 28 restores to normal, and the pulse generation from first port P1 is restarted. Then, the noninverting terminal of the operational amplifier 54 is kept at a level higher than that of the inverting terminal. Therefore, no further reset pulse is generated, so long as the pulse is obtained from first port P1, and the normal operation of the microcomputer 28 is maintained. In this way, the watchdog operation is performed.

Next, the protection operation for the peripheral circuits of microcomputer 28 which goes with the watchdog operation, will be described.

In FIG. 2, a power supply control pulse which is generated by hardware is output from second port P2 of microcomputer 28 to power supply control section 46, after the reset pulse is generated by microcomputer reset circuit 50. Specifically, microcomputer 28 is reset by the input reset pulse, and all the ports are set to a high level in response. Thus, a power supply control pulse is output from second port P2. Afterwards, the initial program is loaded, and the power supply control pulse is stopped by using the program.

Second port P2 of microcomputer 28 is connected to the base of PNP transistor Q10 via resistor R26 in power supply control section 46. The emitter of transistor Q10 is connected to first voltage output terminal 52 of power supply circuit 44. The collector of transistor Q10 is connected to the base of NPN emitter-grounded transistor Q12 via resistor R28, and is further connected to the ground potential via resistor R30. The collector of transistor Q12 is connected to second voltage output terminal 56 of power supply circuit 44 via the coil of relay 58, and is further connected to second voltage output terminal 56 of power supply circuit 44 via diode D14. Second voltage output terminal 56 of power supply circuit 44 is connected to peripheral circuits 60 of microcomputer 28 via normally open contact of relay 58.

In power supply control circuit 46 as configured above, a power supply control pulse is applied to transistor Q10, from second port P2 of microcomputer 28. The pulse causes transistors Q10 and transistor Q12 to be turned off. Relay 58 is then forcibly turned off. Accordingly, the power supply of power supply circuit 44 to microcomputer peripheral circuits 60 is stopped. In this way, when microcomputer 28 enters runaway, the power supply to peripheral circuits 60 is stopped, thus protecting the peripheral circuits.

In the circuit for preventing a microcomputer from malfunctioning having microcomputer reset circuit 50 and power supply control circuit 46 as configured above, peripheral circuits 60 are prevented from being damaged due to the overcurrent flow. When overcurrent flows in peripheral circuits 60, the voltage level of the power obtained at second output terminal 56 of power supply circuit 44 is decreased. The circuit for preventing a microcomputer from malfunctioning detects the voltage level at second output terminal 56, and stops the power supply to the peripheral circuits, depending on the detected level. This is accomplished, as described above, by applying the voltage obtained by dividing the voltage of the second output terminal 56 of power supply circuit 44 with resistors R14 and R16, to the noninverting terminal of operational amplifier 54.

The protection operation for peripheral circuits 60 will now be further described, with reference to the timing chart shown in FIG. 5. In FIG. 5, waveform E is that of the voltage obtained at second voltage output terminal 56 of power supply circuit 44. Waveform F is that of the input voltage of peripheral circuits 60. Waveform G is that of the power supply control pulse from second port P2 of microcomputer 28.

When overcurrent flows in peripheral circuits 60 due to the circuit trouble and the like of the peripheral circuits 60 at time t1, the voltage (waveform E) obtained at second voltage output terminal 56 of power supply circuit 44 decreases accordingly. The voltage (waveform A) of the noninverting terminal of operational amplifier 54 also decreases. At time t2, the voltage at inverting terminal of the operational amplifier becomes larger than that of the noninverting terminal. In response to this, a reset signal (waveform C) for resetting microcomputer 28 is generated at the output terminal of operational amplifier 54. Microcomputer is then reset. In other words, when overcurrent flows in peripheral circuits 60, a reset pulse for resetting microcomputer is formed from time t2 to t3, due to the input voltage decrease at the noninverting terminal of operational amplifier 54, and microcomputer 28 is reset.

In response to the reset operation of microcomputer 28 due to the detection of overcurrent in microcomputer peripheral circuits 60, a power supply control pulse (waveform G) for turning off relay 58 is generated from time t3 to t4, and output from second port P2 of microcomputer 28. This signal causes relay 58 to be turned off, and the power supply (waveform F) to peripheral circuits 60 is stopped. In short, the overcurrent flow in peripheral circuits 60 is detected by comparing the input voltage (waveform A) at the noninverting terminal of operational amplifier 54 with the input voltage (waveform B) at the inverting terminal. Upon detection, a signal reset pulse (waveform C) is generated. By the generated reset pulse, a power supply control pulse (waveform G) is obtained at second port P2, and the relay 58 is turned off.

In this way, when an abnormality occurs in microcomputer peripheral circuits 60, and overcurrent flows, relay 58 is turned off, and microcomputer peripheral circuits 60 are protected from being damaged. At this time, power supply circuit 44 itself is also protected, because the circuit 44 will be disconnected from microcomputer peripheral apparatus 60.

After microcomputer 28 is reset, microcomputer 28 loads and executes the initial program, and starts the pulse generation from first port P1. Microcomputer further stops at time t4 the outputting of the power supply control pulses from second port P2 by program. Relay 58 is then closed, and the power supply to microcomputer peripheral circuits 60 is restarted. If overcurrent is detected again at this point, the above operation is repeated.

Power supply circuit 44 is a high-impedance circuit. The circuit 44 includes transformer 62, double-wave rectifier circuits, smoothing capacitors C26, C28, C30, and C32, three-terminal regulators 64 and 66, and resistor R32. One rectifier circuit is made up of diodes D16 and D18, and capacitors C18 and C20. The other rectifier circuit is made up of diodes D20 and D22, and capacitors C22 and C24.

As can be seen from the foregoing, the circuit for preventing a microcomputer from malfunctioning, according to the present invention, functions both to perform the watchdog operation for preventing the runaway of the program of the microcomputer itself, and to stop the overcurrent in the microcomputer peripheral circuits. In other words, the microcomputer itself is prevented from malfunctioning, while at the same time, the power supply to the peripheral circuits connected to the microcomputer is stopped in response to the overcurrent detection, in order to protect the peripheral circuits.

In particular, when the circuit for preventing a microcomputer from malfunctioning is applied to the terminal devices in a bidirectional CATV system, malfunctioning of the microcomputer in the terminal device is prevented. Therefore, a case never occurs wherein the noise derived from the terminal devices enters into the trunk line. As a result, proper operation of the CATV system can be ensured. The microcomputer peripheral circuits connected to the microcomputer are protected by shutting off the overcurrent to the peripheral circuits. Therefore, the CATV system is prevented from its system down.

It is possible to additionally use units for indicating that microcomputer 28 is reset. For example, a LED may be provided which is lit off when computer is reset, and is lit on when it runs a program. Then, the user can easily ascertain the cause for the reset, since the LED flashes on and off at different periods, depending on whether the reset is due to a runaway of the microcomputer, or due to an overcurrent.

When the program is executed, a case occurs in which the pulses from first port P1 are not generated at a fixed interval of time, that is, the pulses are interrupted temporarily. This can be eliminated by setting time constant τ1 to an appropriate value.

It should be noted that the circuit for preventing a microcomputer from malfunctioning according to this invention is not limited to the CATV system, but is widely applicable to other systems or apparatuses.

What is claimed is:

1. A microcomputer circuit having malfunction prevention, comprising:
    a microcomputer having a first port, a second port, and a reset terminal, for: (1) executing a predetermined sequence of operations, (2) outputting a train of pulses within a predetermined cycle from said first port when said microcomputer is operating normally, (3) temporarily resetting said predetermined sequence of operations when receiving a reset pulse at said reset terminal, and (4) outputting a power supply control pulse from said second port, in response to said reset operation;
    peripheral circuit means connected to said microcomputer;
    power supply circuit means for generating power for energizing said microcomputer and said peripheral circuit means;

reset pulse generating means for receiving said pulse train from the first port of said microcomputer and receiving the output voltage of said power supply circuit means, for generating said reset pulse upon detecting an abnormality in at least one of its input signals, and for supplying said reset pulse to the reset terminal of said microcomputer; and power supply control means for receiving said power supply control pulse from the second port of said microcomputer, and for stopping said power supply circuit means from energizing said peripheral circuit means, in response to said power supply control pulse, said power supply control pulse being output from said second port of said microcomputer after the reset operation for said microcomputer is performed in response to the reset pulse generation by said reset pulse generating means.

2. The circuit according to claim 1, wherein the abnormality in the pulse train as output from the first port of said microcomputer is a dropout of the predetermined cycle in said pulse train due to a malfunctioning of said microcomputer, and the abnormality in the output voltage of said power supply circuit means is a decrease in a level of said output voltage due to the overcurrent flowing in said peripheral circuit means, and said reset pulse generating means includes rectifying means for rectifying said pulse train from the first port of said microcomputer, to convert it to a DC voltage, and comparing means connected to said rectifying means and said power supply circuit means, for comparing the voltage levels as output from said rectifying means and said power supply circuit means, and for generating said reset pulse when the DC voltage level of the rectifying means is larger than the output voltage level of said power supply circuit means.

3. The circuit according to claim 2, wherein said power supply means generates a power of a first voltage level for energizing said microcomputer, and a power of a second voltage level for energizing said peripheral means, and includes first and second output terminals for outputting the respective voltages, and said comparing means is connected to said rectifying means and the second output terminal of said power supply circuit means.

4. The circuit according to claim 3, wherein said comparing means includes an operational amplifier having an inverting input terminal, a noninverting input terminal, and an output terminal, the inverting input terminal being connected to said rectifying means, the noninverting input terminal being connected to the second output terminal of said power supply circuit means, and the output terminal being connected to the reset terminal of said microcomputer.

5. The circuit according to claim 4, wherein said rectifying means includes a charging means for increasing a voltage level applied to said inverting terminal at a predetermined time constant, which is set at a value sufficient to compensate for a pulse drop within the predetermined cycle when said microcomputer is operating normally, in response to the pulse drop, without the predetermined cycle, in the pulse train from the first port of said microcomputer.

6. The circuit according to claim 5, wherein said rectifying means has a high impedance when measured from the inverting input terminal side of said operational amplifier.

7. The circuit according to claim 6, wherein said rectifying means includes a first diode having an anode and a cathode, the anode being connected to the inverting input terminal of said operational amplifier, a first capacitor connected to the node of the cathode of said first diode and the first port of said microcomputer, a second diode having an anode and a cathode, the anode being connected to the cathode of said first diode, and the cathode being connected to the first output terminal of said power supply circuit means, and a second capacitor connected between the inverting terminal of said operational amplifier and the first output terminal of said power supply circuit means.

8. The circuit according to claim 7, wherein the output terminal of said operational amplifier is connected to a time-constant circuit.

9. The circuit according to claim 8, wherein said power supply control means includes a switch means connected between the second output terminal of said power supply circuit means and said peripheral circuit means, for receiving said power supply control pulse, and being turned off in response to said power supply control pulse from the second port of said microcomputer.

10. The circuit according to claim 1, wherein said microcomputer stops outputting said power supply control pulse from said second port after a predetermined period elapses since said reset pulse has not been received at said reset terminal.

11. The circuit according to claim 10, wherein said microcomputer repeats the operations whenever said reset pulse is received at said reset terminal.

12. A terminal unit for a bidirectional CATV system, having a circuit for preventing a microcomputer from malfunctioning, comprising:

frequency-converting means for receiving a pay television signal sent from a central TV station, and for selectively converting the received signal into a signal at a predetermined frequency;

data communication means for communicating data from a subscriber with said central TV station;

peripheral circuit means including input means for inputting said subscriber data, and display means for displaying the data;

a microcomputer having a first port, a second port, and a reset terminal, for inputting and outputting data to and from said peripheral circuit means, and for: (1) controlling said frequency-converting means and data communication means, (2) outputting a train of pulses, within a predetermined cycle, from said first port when said microcomputer is operating normally, (3) temporarily performing a reset operation when said microcomputer receives a reset pulse at said reset terminal, and (4) outputting a power supply control pulse from said second port, in response to said reset operation;

power supply circuit means for selectively generating power for energizing at least said microcomputer and said peripheral circuit means;

reset pulse generating means for receiving said pulse train from the first port of said microcomputer and an output voltage of said power supply circuit means, for generating said reset pulse upon detecting an abnormality in at least one of its input signals, and for supplying said reset pulse to the reset terminal of said microcomputer; and power supply control means for receiving said power supply control pulse from the second port of said microcomputer, and for stopping said power supply circuit means from generating said power to said peripheral circuit means in response to said power supply control pulse, said power supply control pulse being output from said second port of said microcomputer after the reset operation of said microcomputer is performed in response to the reset pulse generation by said reset pulse generating means.

13. A circuit for preventing a microcomputer from malfunctioning, connected to the microcomputer, which microcomputer includes at least one reset port, and is connected to and controls at least one peripheral circuit, and wherein said microcomputer and peripheral circuit are powered by a power supply, coupled to said microcomputer and said peripheral circuit, said circuit for preventing malfunctioning comprising:

watchdog means for generating an indicia indicative of whether said microcomputer is operating correctly;

malfunction determining means, receiving both said indicia from said watchdog means and a power supply voltage from said power supply as input signals, for detecting an abnormality in either of said signals, and generating a reset signal indicative thereof, which is coupled to, and used to reset, said microprocessor;

means for generating a power supply reset signal whenever said microprocessor is reset by said reset signal; and power supply reset means, coupled to receive said power supply reset signal, for interrupting power from said power supply in response thereto.

14. A circuit as in claim 13, wherein said indicia is a series of pulses, and said malfunction determining means includes rectifying means for rectifying said series of pulses to provide an output signal indicative thereof, and comparing means for comparing a voltage of said output signal of said rectifying means with a voltage of said power supply, and for producing said reset signal when said voltage of said output signal of said rectifying means is larger.

* * * * *